United States Patent [19]

Vandenabeele et al.

[11] Patent Number: 5,271,084
[45] Date of Patent: Dec. 14, 1993

[54] METHOD AND DEVICE FOR MEASURING TEMPERATURE RADIATION USING A PYROMETER WHEREIN COMPENSATION LAMPS ARE USED

[75] Inventors: Peter M. N. Vandenabeele; Karen I. J. Maex, both of Herent, Belgium

[73] Assignee: Interuniversitair Micro Elektronica Centrum vzw, Leuven-Heverlee, Netherlands

[21] Appl. No.: 957,443

[22] Filed: Oct. 6, 1992

Related U.S. Application Data

[63] Continuation of Ser. No. 703,189, May 20, 1991, abandoned.

[30] Foreign Application Priority Data

May 23, 1990 [NL] Netherlands ............ 9001200

[51] Int. Cl.$^5$ .................. A21B 2/00; F26B 19/00; G01J 5/00; G01J 5/10
[52] U.S. Cl. .................. 392/416; 374/123; 374/126; 374/161; 356/43; 219/411
[58] Field of Search .............. 374/123, 126, 129, 161; 356/43, 45; 392/416; 219/411

[56] References Cited

U.S. PATENT DOCUMENTS

| | | | |
|---|---|---|---|
| 2,611,541 | 9/1952 | Gray | 356/43 |
| 3,358,974 | 12/1967 | Bernard | 374/123 |
| 3,376,748 | 4/1968 | Glomb | 374/129 |
| 3,462,224 | 8/1969 | Woods et al. | 356/43 |
| 3,796,099 | 3/1974 | Shimotsuma et al. | 374/129 |
| 3,884,075 | 5/1975 | Brandli et al. | 374/129 |
| 3,916,690 | 11/1975 | Brandli | 374/129 |
| 4,433,924 | 2/1984 | Quinn, III | 374/129 |
| 4,465,382 | 8/1984 | Iuchi et al. | 374/126 |
| 4,647,774 | 3/1987 | Brisk et al. | 374/128 |
| 4,653,910 | 3/1987 | Poling | 356/152 |
| 4,890,245 | 12/1989 | Yomoto et al. | 364/557 |
| 4,919,542 | 4/1990 | Nulman et al. | 356/43 |
| 4,956,538 | 9/1990 | Moslehi | 219/411 |
| 4,979,133 | 12/1990 | Arima et al. | 364/557 |
| 4,979,134 | 12/1990 | Arima et al. | 374/126 |

FOREIGN PATENT DOCUMENTS 8701479 1/1989 Netherlands .

*Primary Examiner*—William A. Cuchlinski, Jr.
*Assistant Examiner*—Diego F. F. Gutierrez
*Attorney, Agent, or Firm*—Limbach & Limbach

[57] ABSTRACT

Method and apparatus for measuring the radiation originating from one side of a wafer of semiconductor material using a pyrometer, wherein non-blackbody compensation radiation is projected onto that side to compensate for the reflectivity of the wafer of material and wherein the intensity of the non-blackbody compensation radiation is controlled subject to the amount of radiation measured by the pyrometer.

14 Claims, 5 Drawing Sheets

METHOD AND DEVICE FOR MEASURING TEMPERATURE RADIATION USING A PYROMETER WHEREIN COMPENSATION LAMPS ARE USED

This is a continuation of co-pending application Ser. No. 07/703,189 filed on May 20, 1991 now abandoned.

BACKGROUND OF THE INVENTION

1. Field of the Invention

This invention relates to measuring the radiation temperature of an object, and more particularly, to a method of compensating for the effect of an object's emissivity when measuring the radiation temperature by means of a pyrometer.

2. Description of the Related Art

When measuring the temperature of an object, in particular a wafer of semiconductor material, using a pyrometer with which the radiation generated by the object is measured, the so-called emissivity is of great importance. The emissivity of an object has a value $<1$ because of reflection occurring between the interior of the object and the outside environment, the so-called relectivity. In the case of semiconductor wafers, the emissivity is found in practice to possibly vary between values of 0.4 and 0.9.

SUMMARY OF THE INVENTION

It has been found that the reflectivity of an object can be compensated by projecting compensation radiation on a wafer, the intensity of which depends on the radiation value measured by the pyrometer. Using the method according to the present invention a temperature measurement is therefore made of a wafer of semiconductor material which is independent of the emissivity of the object.

The present invention further provides a method wherein compensation is provided for the transparency of an object, in particular a wafer of semiconductor material, that is, the degree to which radiation leaves the object on the side of the object remote from the pyrometer, or the degree to which the radiation passes through the object.

The present invention further provides a device for measuring the radiation originating from a wafer of semiconductor material using a pyrometer.

The present invention further provides an apparatus for treating a wafer of semiconductor material which comprises a treatment chamber, pyrometer, and compensation lamp, and means for controlling the intensity of the compensation lamp based on the radiation measured by the pyrometer.

Further features, advantages and details will be elucidated in the light of a description of a preferred embodiment thereof, with reference to the appended drawing, in which:

DESCRIPTION OF THE PREFERRED EMBODIMENT

Figure 1:
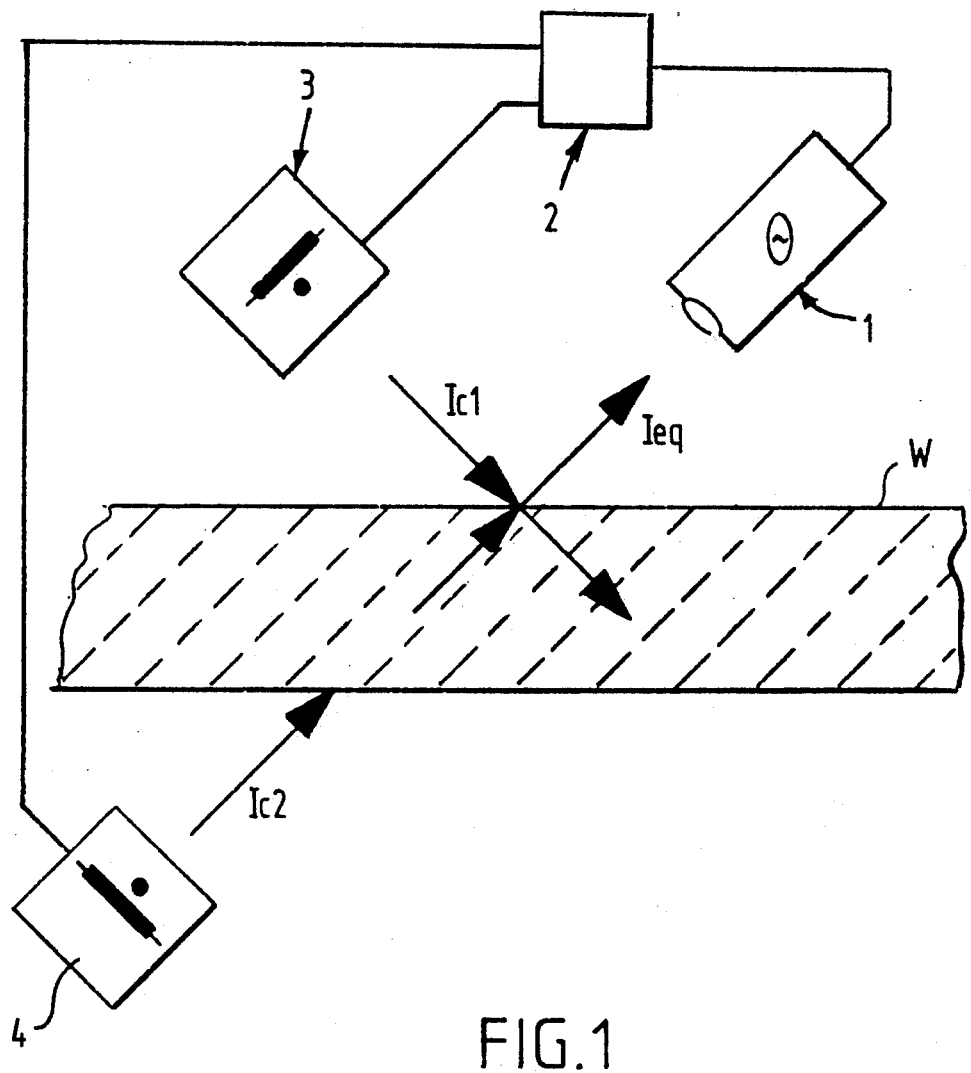
FIG. 1 shows a schematic view of a preferred method according to the present invention.

Referring to FIG. 1, there is shown a pyrometer 1 directed at a wafer of semiconductor material W to determine the amount of radiation origination from the wafer and the temperature thereof. The measurement output of the pyrometer 1 is connected to a control member 2 which in turn is connected to both a first compensation radiation source 3 and a second compensation radiation source 4. The first compensation radiation source 3 projects compensation radiation with a wavelength suitable for the pyrometer 1 ($\lambda = 0.9 – 5.0$ $\mu$m) onto the region of the wafer W at which the pyrometer 1 is directed.

As a first example of the use of the method and device of the present invention, consider the situation where only the reflectivity of the wafer is to be compensated for. As indicated by the arrows in FIG. 1, some portion of the compensation radiation ($I_{c1}$) is reflected by wafer W to pyrometer 1, and some portion is transmitted into wafer W, where it is absorbed.

If the reflection coefficient is characterized by R, then it is well known in the art that the radiation received at pyrometer 1 is a combination of that portion of the compensation source which is reflected, and the radiation emitted by wafer W itself, and is described by:

$$I_{pyro} = I_{c1}*R + I_w*\epsilon,$$

where $I_{pyro}$: radiation intensity measured by pyrometer;
$I_{c1}$: radiation intensity of 1st compensation source;
$I_w$: radiation intensity of wafer or object;
R: reflectivity coefficient of wafer or object; and
$\epsilon$: emissivity coefficient of wafer or object.

If $I_{c1}$ is now adjusted until the measured $I_{pyro} = I_{c1}$, then one obtains:

$$I_{c1} = I_{c1}*R + I_w*\epsilon,$$

or rearranging, $$I_{c1}*(1-R) = I_w*\epsilon.$$

It is also well known in the art that for a body at thermal equilibrium, the emissivity and reflectivity coefficient are related, with the relationship described by:

$$(\epsilon + R) = 1, \text{ so that } \epsilon = 1 - R.$$

When the compensation source has been adjusted so that $I_{pyro} = I_{c1}$, one obtains the relationship:

$$I_{c1}*(1-R) = I_w*\epsilon = I_w*(1-R),$$

so that $$I_{c1} = I_w.$$

This means that when $I_{pyro} = I_{c1}$, the pyrometer is measuring the thermal equilibrium radiation intensity from the wafer, $I_{eq}$, where $I_{pyro} = I_{c1} = I_{eq}$:

$$I_{pyro} = I_{eq}*R + (1-R)*I_{eq} = I_{eq}.$$

This result allows one to infer the temperature of the wafer by methods known in the art which relate the intensity of radiation emitted in a wavelength band by a body at thermal equilibrium to its temperature. Thus, it is demonstrated that for the value of the compensation radiation $I_{c1}$, where $I_{c1} = I_{eq}$, is true, that is, the equilibrium radiation value $I_{eq}$ measured by the pyrometer, this $I_{eq}$ is the compensated radiation value for a wafer W with emissivity 1. From methods well known in the art the temperature of the wafer W can now be derived from the measured $I_{eq}$. A compensation radiation source must be precisely calibrated so that the amount of compensation radiation $I_c$ can be accurately controlled subject to the voltage to be supplied by the control member 2. The emissivity must be greater than 0.1–0.2 so that the formed control loop is sufficiently accurate and rapid.

When a second compensation lamp 4 is used to also compensate for the transmissivity of wafer W, as indicated by FIG. 1, some portion of the radiation is transmitted through the wafer and some portion is absorbed by the wafer, where the relationship between these components is given by:

$$I_{pyro} = I_{c1}*R + I_{c2}*\tau + I_w*\epsilon,$$

where
$I_{c2}$: radiation intensity of 2nd compensation source;
$\tau$: transmissivity coefficient of wafer or object; and
the other quantities are as defined previously.
In this case, as is also well known in the art, the emissivity, reflectivity, and transmissivity are related by:

$$(\epsilon + R + \tau) = 1, \text{ so that } \epsilon = (1 - R - \tau).$$

If the compensation sources are adjusted so that $I_{pyro} = I_{c1} = I_{c2}$, one obtains:

$$I_{c1} = I_{c1}*R + I_{c1}*\tau + I_w*(1-R-\tau) = I_{c1}*(R+\tau) + I_w*(1-R-\tau).$$

Rearranging the terms gives:

$$I_{c1}*(1-R-\tau) = I_w*(1-R-\tau).$$

This means that when $I_{pyro} = I_{c1} = I_{c2}$, the pyrometer is measuring the thermal equilibrium radiation intensity from the wafer, $I_{eq}$, where $I_{pyro} = I_{c1} = I_{c2} = I_{eq}$. Again, the temperature of wafer W may be inferred from the measurement of $I_{eq}$ by methods well known in the art.

Thus, the radiation $I_{c2}$ originating from the second compensation radiation source 4 compensates in a corresponding manner for the transparency or permeability of the wafer of semiconductor material W, when $I_{c2} = I_{eq}$.

Applicants' invention thus provides a method and apparatus for inferring the temperature of a body, here wafer W, using radiation sources which compensate for the body's reflectivity and transmissivity. Given a source of radiation impinging upon a body, some portion is reflected, some portion is absorbed, and some portion is transmitted through the body. The relationship $(\epsilon + R + \tau) = 1$ is simply an expression of energy conservation, where for a body at equilibrium, the absorption coefficient equals the emissivity (by Kirchhoff's law, as is well known in the art).

Thus, in accordance with Applicants' invention, if the compensation sources are adjusted (as by control member 2) until their intensities are equal to each other, and equal to the measurement by the pyrometer, then the radiation intensity measured by the pyrometer is the equilibrium intensity of the body. From this measurement the temperature of the body may then be determined by methods well known in the art.

Figure 2:
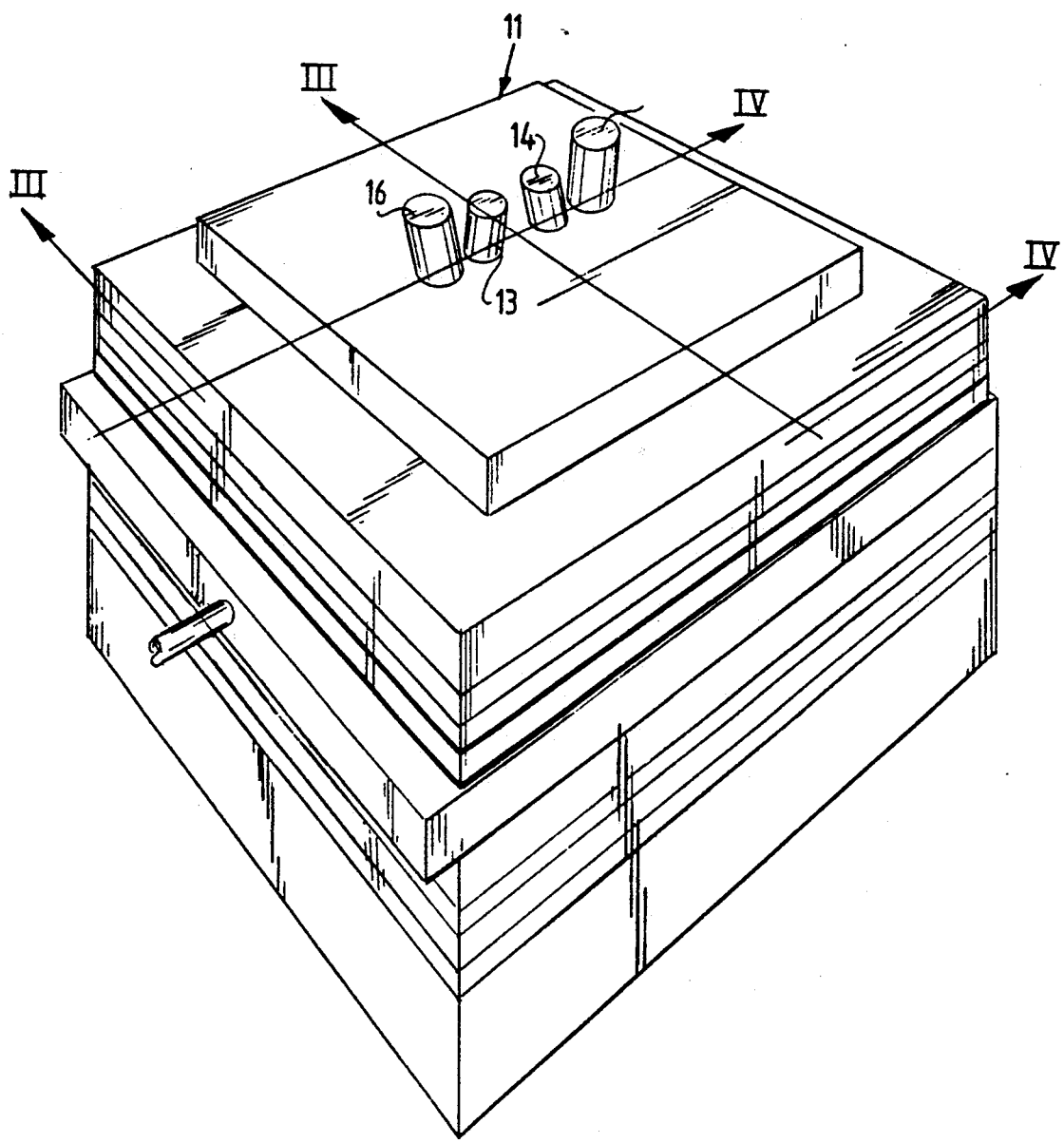
FIG. 2 shows a schematic view in perspective of a preferred embodiment of a device according to the present invention.
Figure 3:
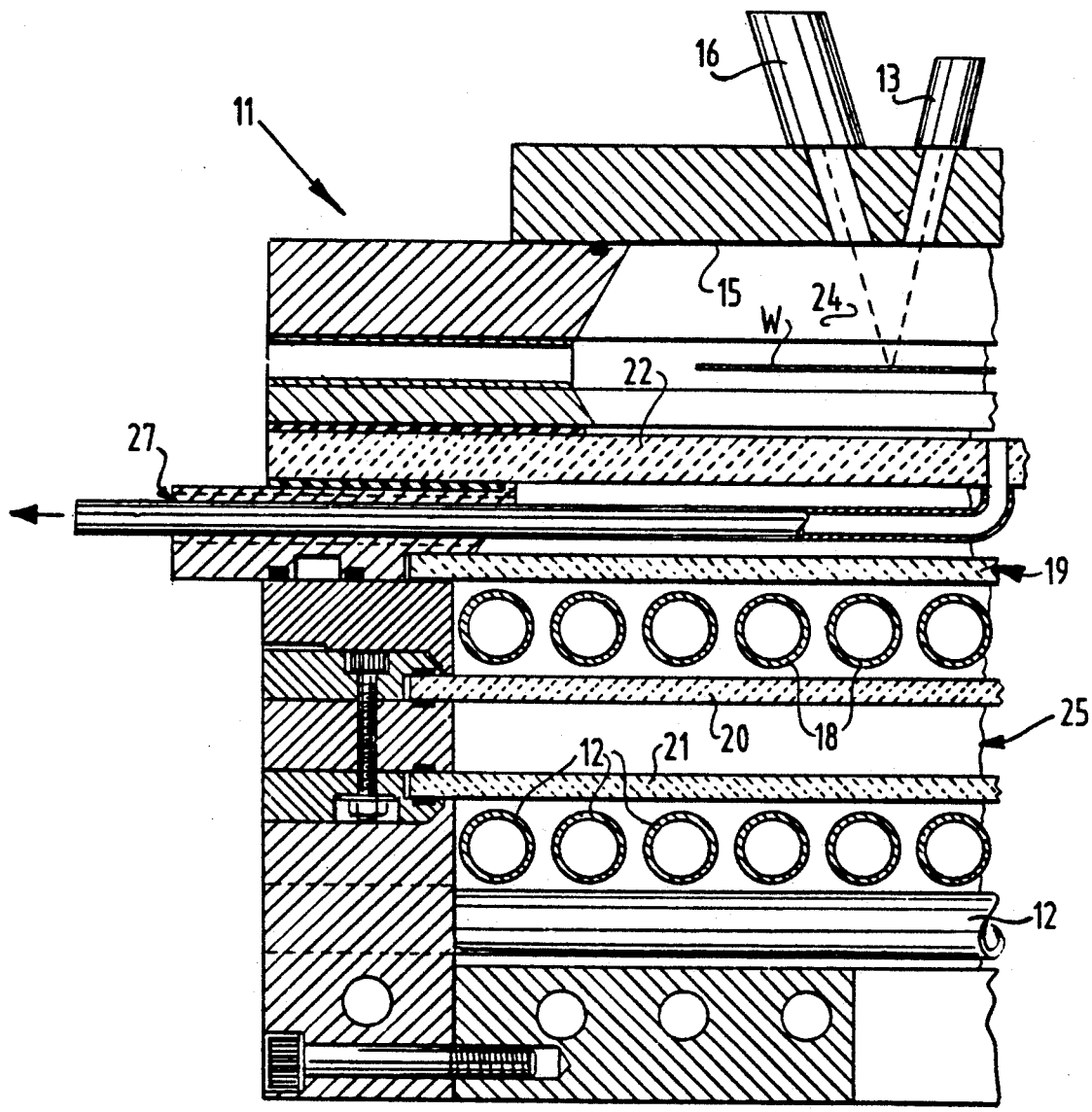
FIG. 3 shows a section along line III—III of FIG. 2.
Figure 4:
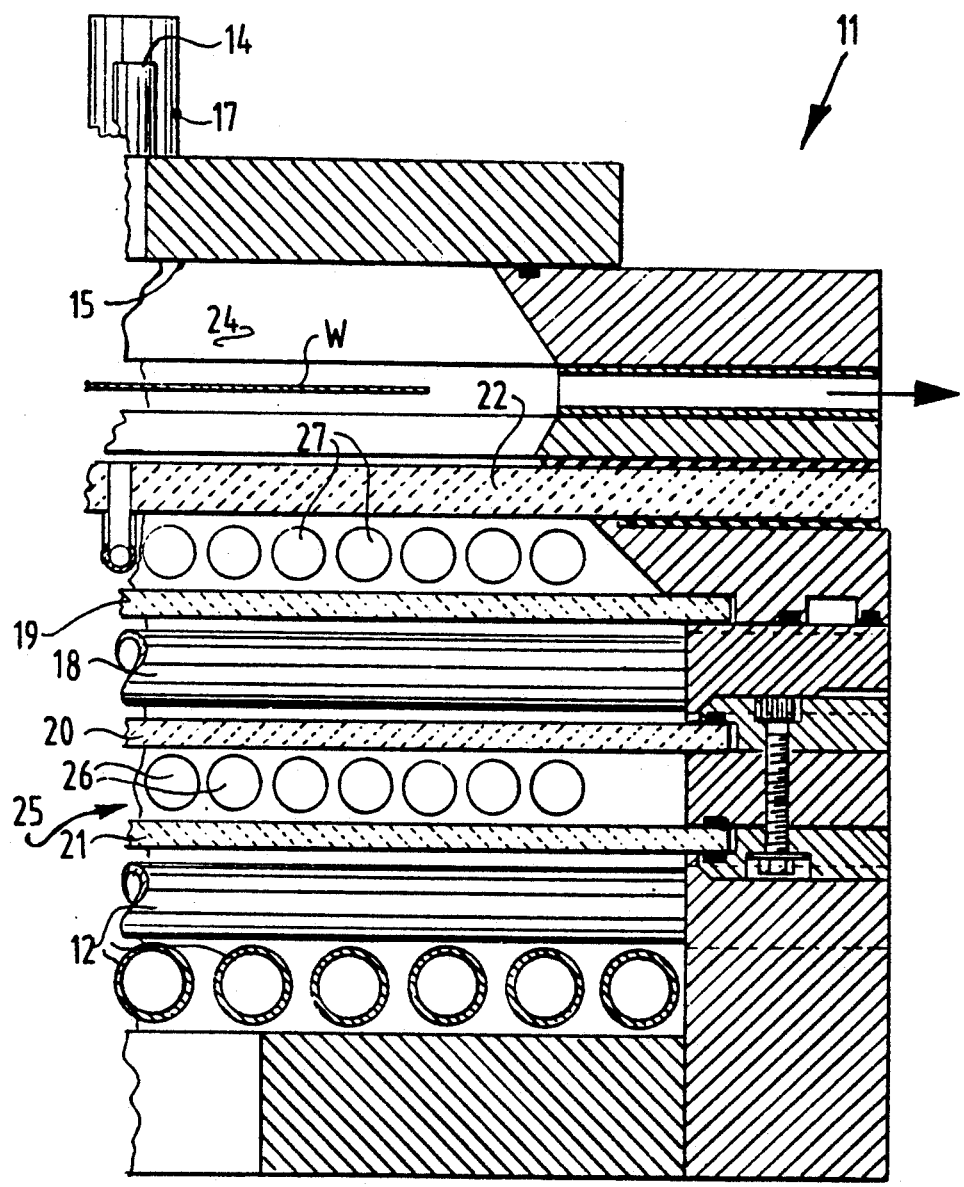
FIG. 4 shows a section along line IV—IV in FIG. 2.

A preferred embodiment of a device 11 (FIGS. 2, 3, 4) according to the present invention relates to a device for rapid heating (Rapid Thermal Processing (RTP)) of silicon wafers, for example for 30 seconds at a temperature of 300°–1200° C., using infrared lamps, bulb filaments or graphite elements. A (circular) wafer of semiconductor material W is heated on the underside by infrared lamps 12, while on the upper side one or more pyrometers 13, 14 are received into a reflecting wall 15 together with associated compensation lamps 16 and 17 respectively.

Two compensation lamps 18 are further disposed on the underside, provided with a window 19 roughened on at least one side for projecting a diffuse bundle of compensation light onto the underside of the wafer W. Arranged between the compensation lamps 18 and the infrared lamps 12 is a water-cooled window 25 comprising cooling water to be supplied via openings 26 as well as two plates 20, 21 allowing passage of radiation. The water-cooled window 25 serves to absorb radiation from infrared lamps 12 in the wavelength region of the pyrometers 13, 14 thereby acting as a filter to remove some portion of the radiation produced by infrared lamps 12. It also ensures that the wafer of material W does not heat up unnecessarily on the underside and radiates less radiation to the underside. The plates 20, 21 are further cooled by the water.

A window 22 is composed of quartz and is resistant to the forces occurring due to the vacuum which may be generated in the treatment chamber 24. The quartz window 22 can be further cooled with air by supply thereof through openings 27.

A first pyrometer is preferably suitable for measurements in a temperature range of 500°–1200° C. ($\lambda = 1.5$–$1.8$ $\mu m$) and a second pyrometer suitable for a temperature range of 200°–800° C. ($\lambda = 3.0$–$3.3$ $\mu m$). The associated compensation lamps for the relevant wavelength are preferably embodied as halogen lamps (i.e., a non-blackbody source) of relatively low power (100–200 Watt).

In the preferred embodiment, a semi-reflecting mirror (not shown) can be arranged between the compensation lamps and the wafer of semiconductor material, wherein the pyrometer also receives radiation via this semi-transparent mirror. This has the advantage that for each pyrometer only one opening needs to be arranged in the chamber. The semi-reflecting mirror is preferably a wafer of silicon material, optionally to be provided with a layer filtering the radiation according to wavelength.

When the pyrometers display sensitivity to radiation coming from the infrared lamps, these lamps are preferably equipped with filters for filtering this radiation.

The compensation radiation sources are preferably provided with a matt glass so that the intensity of the radiation is spread over a sufficiently large area, thereby providing a diffuse bundle or source of compensation radiation.

In a manner not shown, the radiation is preferably made diffuse using a facetted mirror or lens preferably composed of aluminum and silicon dioxide, which may or may not be provided with quartz.

Figure 5:
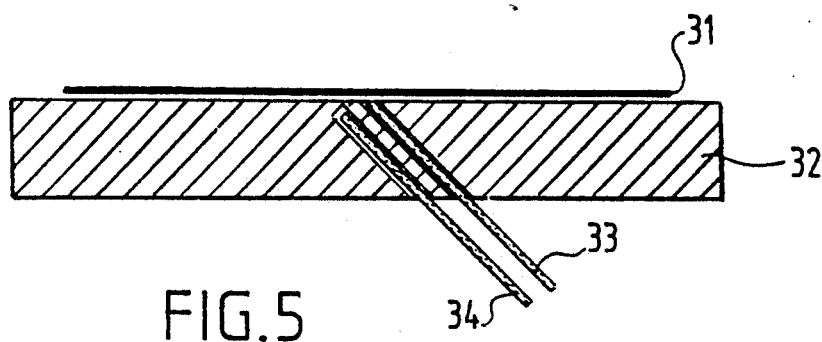
FIG. 5 is a schematic side view of a second preferred embodiment of the present invention.

Referring to FIG. 5, in a second preferred embodiment according to the present invention the temperature of a wafer of semiconductor material 31, which is heated by means of a holder 32 heated in a manner not shown here, is measured using an optic fibre 33 which is arranged through the holder 32 and connected in a manner not shown to a radiation meter the measurement value of which is compensated for the radiation coming from the holder 32 by means of a second optic fibre 34 which is arranged in a blind hole in the holder 32 and to which a radiation meter is likewise connected.

Figure 6:
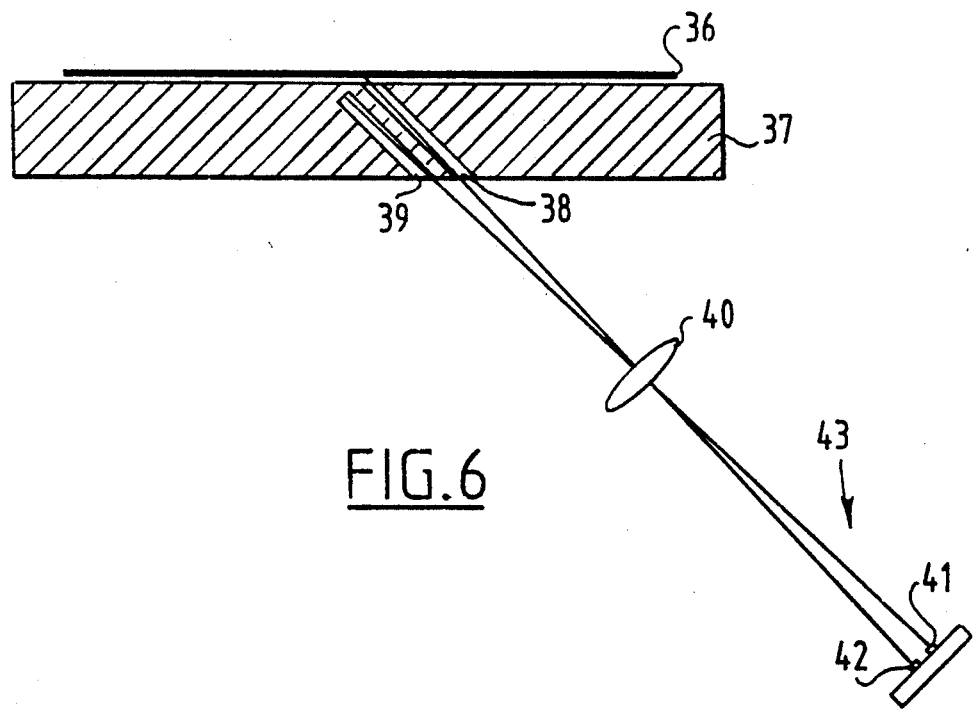
FIG. 6 shows a third preferred embodiment of the present invention.

Referring to FIG. 6, in a third preferred embodiment according to the present invention a wafer of semiconductor material 36 is heated by a holder 37 in a manner not shown here and provided with a through-opening 38 and a blind hole 39. The radiation coming from these openings is guided via a lens 40 to detectors 41 and 42 of the schematically designated pyrometer 43. By means of radiation coming from the blind hole 39 compensation is made for the temperature radiation from the holder 37. In both the second and the third preferred embodiment the holder or chuck serves as compensation radiation. A radiation with a wavelength around 1.0 μm is preferably employed so that measurement can be made in a temperature use range of 0°-1200° C. At the said wavelength there occurs no transparency of the silicon wafer in the said temperature range.

The present invention is not limited to the above stated preferred embodiment for Rapid Thermal Processing; the method and device according to the invention are applicable in the semiconductor industry in installations for RTCVD, MBE, etc., or even in other applications, as may be apparent from the following claims.

We claim:

1. An apparatus for treating a wafer of semiconductor material, comprising:
   a treatment chamber wherein the wafer of semiconductor material is treated;
   at least one pyrometer received into a wall of the treatment chamber;
   at least one non-blackbody compensation lamp which compensates for the reflectivity of the wafer by projecting non-blackbody compensation radiation onto the wafer of semiconductor material, and
   means connected to the pyrometer for controlling the intensity of the compensation lamp which compensates for the reflectivity of the wafer subject to the measurement value of the pyrometer.

2. An apparatus as claimed in claim 1, wherein the treatment chamber is provided with heating elements for RTP (rapid thermal processing) of the wafer of semiconductor material.

3. An apparatus as claimed in claim 2, wherein the heating elements are disposed on one side of the water of semiconductor material to be inserted and wherein the pyrometer and the compensation lamp which compensates for the reflectivity of the wafer are disposed on the other side of the water of semiconductor material.

4. An apparatus as claimed in claim 1, 2, or 3, wherein light diffusion means is arranged in front of the compensation lamp which compensates for the reflectivity of the water in order to provide a diffuse bundle of compensation light.

5. An apparatus as claimed in claim 3, wherein a non-blackbody compensation lamp which compensates for the transparency of the water is disposed on the side of the water of semiconductor material which is opposite from the side where the pyrometer is disposed.

6. An apparatus as claimed in claim 5, further comprising a filter arranged between the heating elements and the pyrometer, wherein the filter reduces the sensitivity of the pyrometer to the radiation from the heating elements.

7. An apparatus as claimed in claim 5, wherein light diffusion means is arranged in front of the compensation lamp which compensates for the transparency of the water in order to provide a diffuse bundle of compensation light.

8. An apparatus as claimed in claim 1, wherein a non-blackbody compensation lamp which compensates for the transparency of the wafer is disposed on the side of the wafer of semiconductor material which is opposite from the side where the pyrometer is disposed.

9. An apparatus as claimed in claim 8, wherein light diffusion means is arranged in front of the compensation lamp which compensates for the transparency of the wafer in order to provide a diffuse bundle of compensation light.

10. An apparatus for treating a wafer of semiconductor material, comprising:
    a treatment chamber wherein the wafer of semiconductor material is treated;
    at least one pyrometer received into a wall of the treatment chamber;
    at least one compensation lamp which compensates for the reflectivity of the wafer for projecting compensation radiation onto the wafer of semiconductor material;
    means connected to the pyrometer for controlling the intensity of the compensation lamp which compensates for the reflectivity of the wafer subject to the measurement value of the pyrometer;
    heating elements for RTP (rapid thermal processing) of the wafer of semiconductor material, wherein the heating elements are disposed on one side of the wafer of semiconductor material to be inserted and wherein the pyrometer and the compensation lamp which compensates for the reflectivity of the wafer are disposed on the other side of the wafer of semiconductor material; and
    a water-cooled window arranged between the wafer and the heating elements.

11. An apparatus for measuring the radiation originating from one side of a wafer of semiconductor material comprising:
    a pyrometer,
    first compensation means for projecting first compensation radiation onto the one side of the wafer to compensate for the reflectivity of the wafer of material, wherein the first compensation radiation projected onto the one side of the wafer is provided by a halogen lamp, and
    control means operatively connected to the pyrometer for controlling the first compensation means so that the intensity of the first compensation radiation is subject to the amount of radiation measured by the pyrometer.

12. The apparatus as claimed in claim 11, further comprising:
    second compensation means for projecting a second compensation radiation onto the other side of that wafer of semiconductor material to compensate for the transparency, wherein the second compensation radiation projected onto the other side of that wafer is provided by a halogen lamp, and wherein the control means controls the second compensation means so that the intensity of the second compensation radiation is subject to the amount of radiation measured by the pyrometer.

13. An apparatus for treating a wafer of semiconductor material, comprising:
- a treatment chamber wherein the wafer of semiconductor material is treated;
- at least one pyrometer received into a wall of the treatment chamber;
- at least one compensation lamp which compensates for the reflectivity of the wafer for projecting compensation radiation onto the wafer of semiconductor material;
- a compensation lamp which compensates for the transparency of the wafer disposed on the side of the wafer of semiconductor material which is opposite from the side where the pyrometer is disposed;
- means connected to the pyrometer for controlling the intensity of the compensation lamps which compensate for the reflectivity and the transparency of the wafer subject to the measurement value of the pyrometer;
- heating elements for RTP (rapid thermal processing) of the wafer of semiconductor material, wherein the heating elements are disposed on one side of the wafer of semiconductor material to be inserted and wherein the pyrometer and the compensation lamp which compensates for the reflectivity of the wafer are disposed on the other side of the wafer of semiconductor material; and
- a water-cooled window arranged between the wafer and the heating elements.

14. An apparatus for treating a wafer of semiconductor material, comprising:
- a treatment chamber wherein the wafer of semiconductor material is treated;
- at least one pyrometer received into a wall of the treatment chamber;
- at least one compensation lamp for projecting compensation radiation onto the wafer of semiconductor material;
- heating elements for RTP (rapid thermal processing) of the wafer of semiconductor material, wherein the heating elements are disposed on one side of the wafer of semiconductor material and wherein the pyrometer is disposed on the other side of the wafer of semiconductor material, and further, wherein between the wafer and the heating elements a water-cooled window is arranged; and
- means connected to the pyrometer for controlling the intensity of the compensation lamp subject to the measurement value of the pyrometer.

* * * * *